(12) United States Patent
Gaudre-Longerinas et al.

(10) Patent No.: US 6,328,891 B1
(45) Date of Patent: Dec. 11, 2001

(54) PROCESS FOR THE BIOLOGICAL PURIFICATION OF A WATER CONTAINING AMMONIUM PERCHLORATE

(75) Inventors: Marie Gaudre-Longerinas, Le Haillan; Jean-Michel Tauzia, Blanquefort, both of (FR)

(73) Assignee: SNPE, Paris (FR)

( * ) Notice: Subject to any disclaimer, the term of this patent is extended or adjusted under 35 U.S.C. 154(b) by 0 days.

(21) Appl. No.: 09/459,461

(22) Filed: Dec. 13, 1999

(30) Foreign Application Priority Data

Dec. 30, 1998 (FR) .................................................. 98 16612

(51) Int. Cl.$^7$ ....................................................... C02F 3/00
(52) U.S. Cl. .................... 210/605; 210/610; 210/611; 210/630; 210/757; 210/758; 435/262.5
(58) Field of Search ..................................... 210/605, 610, 210/611, 620–630, 757, 758; 435/262.5

(56) References Cited

U.S. PATENT DOCUMENTS

| 3,755,156 | 8/1973 | Yakovlev et al. . |
| 3,943,055 | 3/1976 | Korenkov et al. . |
| 4,126,544 | 11/1978 | Baensch et al. . |
| 4,401,569 | 8/1983 | Jhaveri et al. . |
| 5,302,285 | 4/1994 | Attaway et al. . |
| 6,077,432 | * 6/2000 | Coppola . |
| 6,214,607 | * 4/2001 | Logan . |

FOREIGN PATENT DOCUMENTS

| 258 911 A3 | 8/1988 | (DE) . |
| 2 138 231 | 1/1973 | (FR) . |
| 2 277 045 | 1/1976 | (FR) . |
| 2 336 354 | 7/1977 | (FR) . |

OTHER PUBLICATIONS

J. M. Hurley et al., *Ammmonium Perchlorate Gradation*, The Military Engineer, vol. 88, No. 579, Aug. 1996, p. 56, XP002114123.

* cited by examiner

*Primary Examiner*—Chester T. Barry
(74) *Attorney, Agent, or Firm*—Oliff & Berridge, PLC

(57) ABSTRACT

The invention relates to a process for the biological purification of a water containing ammonium perchlorate, characterized in that aqueous ammonium perchlorate solution is placed in contact, in a first, aerobic reactor, with an activated sludge in the presence of at least one source of mineral carbon and nutritional elements for the metabolism of the microorganisms, and then in that the liquid effluent leaving the first reactor is placed in contact, in a second, anoxic reactor, with an activated sludge, in the presence of at least one source of organic carbon and nutritional elements for the metabolism of the microorganisms.

The process makes it possible to treat aqueous solutions containing very large amounts of ammonium perchlorate and to convert both the ammonium ions into molecular nitrogen and the perchlorate ions into chloride ions.

16 Claims, No Drawings

PROCESS FOR THE BIOLOGICAL PURIFICATION OF A WATER CONTAINING AMMONIUM PERCHLORATE

The invention relates to a process for purifying a water in which ammonium perchiorate is dissolved, by means of a biological treatment. The invention applies in particular to the treatment of industrial waste water contaminated with ammonium perchlorate originating from propergols.

Propergols are reliable only for a limited period, beyond which it is necessary to destroy them. This destruction can be carried out by incineration, but this incineration releases toxic fumes and is unsatisfactory. A more advantageous process consists in grinding the propergols under water. Propergols, in particular from rockets or large missiles, generally consist of more than 50% ammonium perchlorate powder. The grinding waters will consequently contain a large amount of dissolved ammonium perchlorate. Now, in order to respect the environment, it is not possible to discard into nature these waters containing both ammonium ions and perchlorate ions, originating from the dissociation of ammonium perchlorate, which are contaminants.

A number of processes for eliminating by treating chlorates and perchlorates dissolved in water have been described.

According to patent FR 2,138,231 corresponding to U.S. Pat. No. 3,755,156, the process consists firstly in mixing spent industrial water with urban waste water and then in carrying out the biological reduction of the chlorates and perchlorates in an anoxic reactor, the biochemical oxygen consumption by the mixture of waters needing to exceed by at least 20 mg/l the amount of oxygen associated in the form of inorganic combinations. This process requires the use of a large amount of urban waste water to obtain the desired value for the biochemical oxygen consumption. The admissible concentration of ammonium perchlorate in the water to be purified is low, of the order of 150 mg/l.

An improvement to this process, described in patent FR 2,277,045 corresponding to U.S. Pat. No. 3,943,055, consists in carrying out the previous process by adding a particular strain of microorganisms known as Vibrio dechloraticans Cuznesove B-1168. The admissible concentration of ammonium perchlorate in the aqueous solution is again low, of the order of 300 mg/l. This process has the same drawbacks as those mentioned above, and, in addition, it is necessary beforehand to obtain and adapt an uncommon strain of microorganisms.

According to another process, described in U.S. Pat. No. 5,302,285, the spent water is treated in an anoxic reactor using a microorganism such as HAP1 and then in an aerobic reactor. The concentration of ammonium perchlorate in the water to be treated is about 7 g/l. As in the preceding process, a specific microorganism must first be cultured. Although the rate of degradation of the perchlorates is improved, this process, like the previous ones, allows removal from the water, primarily, only of the perchlorate ions.

Now, it is not possible to discard into the environment, without the risk of polluting lakes and rivers and also underground water tables and surface waters, waters containing a large amount of nitrogen in ammoniacal form. Aquatic life is in particular affected at and above a concentration of about 2 mg/l of ammonium ions.

There is thus a need for a process for purifying a water containing ammonium perchlorate which is simple and economical and which makes it possible to remove both the perchlorate ions and the ammonium ions, converting the latter ions into molecular nitrogen.

The subject of the invention is consequently a process for the biological purification of a water containing ammonium perchlorate, which consists in treating this water with microorganisms in two successive reactors, characterized in that:

aqueous ammonium perchlorate solution is placed in contact, in a first, aerobic reactor, with an activated sludge containing nitrifying microorganisms, in the presence of at least one source of mineral carbon and nutritional elements for the metabolism of these microorganisms, and then in that the liquid effluent leaving the first reactor is placed in contact, in a second, anoxic reactor, with an activated sludge containing denitrifying microorganisms and perchlorate-ion-reducing microorganisms, in the presence of at least one source of organic carbon and nutritional elements for the metabolism of these microorganisms.

The process according to the invention is simple to carry out. It does not require the use of complex installations, nor the use of urban waste water, nor that of uncommon microorganisms.

It allows the treatment of aqueous solutions containing very large amounts of ammonium perchlorate, including solutions saturated with an excess of undissolved ammonium perchlorate. The solutions used preferably contain up to 100 g/l thereof.

It allows the degradation both of the ammonium ions into molecular nitrogen and of the perchlorate ions into chloride ions. Specifically, it has been found that, contrary to what might be feared, the perchlorate ions are, under the conditions of the process, non-toxic for the growth of the microorganisms involved in the process for degrading the ammonium ions, and in particular for that of Nitrobacters.

The process is characterized more particularly in that, in the first, aerobic reactor, the operation of placing in contact with the activated sludge is carried out with a content of molecular oxygen, dissolved in the mixture, of greater than 2 mg/l, with a pH of the mixture maintained between 6 and 9 and at a temperature of between 16° C. and 45° C.

The duration of this placing in contact in the aerobic reactor is, in particular, between 15 and 50 days depending on the flow rate chosen and on the ammonium ion concentration of the aqueous solution entering the reactor, as well as on the volume of the reactor, so as to ensure a rate of nitrification of between 1.5 mg and 2 mg of N—$NH_4^+$/l/h.

The source(s) of mineral carbon in the reactor are more particularly in an amount such that the mass ratio: mineral carbon atoms/nitrogen atoms to be oxidized ($C^1/N^1$), is greater than 1.5.

In the second, anoxic reactor, the operation of placing in contact is more particularly carried out with a content of molecular oxygen, dissolved in the mixture, of less than 0.5 mg/l, at a pH of between 7 and 9 and at a temperature of between 18° C. and 45° C.

The duration of this operation is, in particular, between 15 and 50 days depending on the entry flow rate of the effluent, its concentration of NOx ions and the volume of the anoxic reactor, so as to ensure a rate of denitrification of between 1.5 mg and 2 mg of N—NOx/l/h. The term "NOx ions" means the combination of nitrate and nitrite ions.

The source(s) of organic carbon is(are) present in this anoxic reactor in an amount such that the mass ratio: organic carbon atoms/nitrogen atoms to be reduced ($C^2/N^2$), is greater than 1.

By virtue of the process according to the invention, the industrial waste water, in particular propergol washing waters, can be decontaminated and discarded into the environment like other waste waters satisfying the standards in force.

The invention will be understood more clearly in the light of the more detailed description of the process which follows.

In the description and the claims, all the numbers expressing amounts of compounds or of reaction conditions should be interpreted as being preceded by the term "about". The limits of the ranges are included therein.

The process is generally carried out in the following way. The two reactors, the first aerobic and the second anoxic, are placed in series and are fitted with the necessary devices, in particular for stirring them, for the introduction and removal of the liquids, for the introduction of the various compounds, and for monitoring the pH value and the dissolved oxygen value.

An activated sludge is placed in these two reactors. In the aerobic reactor, the activated sludge should contain microorganisms capable of nitrifying ammonium ions into nitrite and nitrate ions. These microorganisms are common microorganisms, such as those found in urban waste water, for example bacteria belonging to the Nitrosococcus, Nitrosospira and Nitrosomonas families for the nitritation and the Nitrobacter family for the nitratation.

In the anoxic reactor, the activated sludge should contain microorganisms capable of denitrifying nitrate and nitrite ions into molecular nitrogen and of reducing perchlorate ions into chloride ions. These microorganisms are also common microorganisms, such as those found in urban waste water, for example bacteria of the Pseudomonas, Micrococcus, Denitrobacillus, Sirillum and Achroniobacter families.

The activated sludge can originate from the purification of urban waste water, but may also be developed from common microorganisms such as those described above.

It is possible for the activated sludge placed in the reactors not to contain a sufficient amount of nitrifying, denitrifying and perchlorate-reducing microorganisms. In this case, it is treated, in a known manner, such that these microorganisms grow, for example by incorporating a nutrient element which serves for their growth.

These microorganisms are also acclimatized to process ammonium perchlorates, for example by passing an aqueous solution of increasingly high ammonium perchlorate concentration into the two reactors containing the activated sludge.

In the first reactor, the aerobic reactor, the amount of molecular oxygen dissolved is preferably between 4 and 5 mg/l. Air can be injected into the reactor to obtain these values.

The nitrification is generally carried out at a pH of from 6 to 9 and preferably from 7 to 7.5. Various compounds capable of neutralizing the H+ions produced, and which are non-toxic to the nitrifying microorganisms, can be added to maintain this pH, such as, for example, sodium hydrogen carbonate, calcium carbonate or magnesium hydroxide.

It is also necessary to provide the nitrifying microorganisms with mineral carbon. This mineral carbon can be provided by one or more compounds chosen from the usual compounds, for example from carbonates.

The mass ratio of the mineral carbon atoms to the nitrogen atoms to be oxidized is preferably between 1.7 and 1.8.

It is advantageous to use compounds which not only neutralize the H$^+$ions but which, at the same time, provide the mineral carbon, such as, for example, sodium hydrogen carbonate.

The temperature of the mixture in the aerobic reactor is preferably between 25° and 40° C.

Nutritional elements are also required to ensure the growth of the microorganisms, in particular nitrifying and denitrifying microorganisms, which need to process the ammonium perchlorate.

The microorganisms need to receive both iron, calcium, potassium, magnesium and phosphate. These nutritional elements are consequently provided by compounds which can release them. For example, mention may be made of mineral salts, such as potassium phosphate, ferric chloride, calcium chloride and magnesium sulphate.

These nutritional compounds, along with the other compounds to be added for the nitrification, can be introduced into the aerobic reactor or they can be placed in the aqueous solution before it enters the reactor. The amount of nutritional compounds added at this point may be an amount greater than that required by the microorganisms in the aerobic reactor. The effluent leaving the aerobic reactor thus already contains all or some of the amount which is useful to the microorganisms in the anoxic reactor.

The volume of the reactor and the flow rate of the effluent are chosen as a function of the ammonium perchlorate concentration of the aqueous solution, characteristics of the activated sludge used such that the residence time in the reactor is in particular between 15 and 50 days, preferably between 30 and 40 days, and such that the rate of nitrification is in particular between 1.5 mg and 2 mg of N—NH$_4$+/l/h and preferably between 1.6 and 1.8 mg of N—NH$_4$+/l/h.

It is thus possible, for example, to process an aqueous solution containing 12 g/l of ammonium perchlorate by introducing it at a flow rate of 1.15 m$^3$/h into a 1000 m$^3$ aerobic reactor containing an activated sludge for purifying urban waste water with nitrifying microorganisms. The ammonium ions are virtually all converted into nitrite or nitrate ions in 36 days.

The liquid effluent which leaves the aerobic reactor is then introduced into the second reactor, the anoxic reactor, and becomes mixed with the activated sludge contained therein. The content of dissolved molecular oxygen in the mixture is preferably less than 0.2 mg/l.

The pH of the mixture in this reactor is preferably from 7.5 to 8.5 and its temperature is preferably maintained between 25° and 40° C.

It is necessary to provide the mixture with organic carbon which can be assimilated by the microorganisms, in order to ensure their growth. It has been established that the ratio of the mass of the organic carbon atoms to the mass of the nitrogen atoms should in particular be greater than 1 and preferably between 1.2 and 1.3.

One or more of the compounds usually known as a source of organic carbon can be used. Preferably, the compounds are chosen from the group consisting of methanol, ethanol, propanol, isopropanol and butanol. Molasses, glucose and sucrose may also be suitable.

The compounds can be introduced into the anoxic reactor or into the effluent between the two reactors.

Nutritional elements such as those mentioned above should also be present in order to ensure the growth of the microorganisms.

If the amount of nutritional elements added to the aqueous solution or to the aerobic reactor was not large enough, the required amount of nutritional compounds is then added to the anoxic reactor or to the effluent between the two reactors.

Under these reaction conditions, the nitrate and nitrite ions are reduced to molecular nitrogen and the perchlorate ions are reduced to chloride ions.

The volume of the reactor is chosen as a function of the entry flow rate of the effluent, its concentration of ions to be degraded and the characteristics of the activated sludge such that the residence time is in particular between 15 and 50 days, preferably between 30 and 40 days, so as to ensure a rate of denitrification of between 1.5 and 2 mg of N—NOx/l/h and preferably between 1.6 and 1.8 mg of N—NOx/l/h. The rate of reduction of the perchlorate ions to chloride ions is generally between 10 and 20 mg of $ClO_4^-$/l/h and in particular between 11 and 13 mg of $ClO_4^-$/l/h.

For example, an anoxic reactor placed in series with the 1000 $m^3$ aerobic reactor mentioned above into which an aqueous solution containing 12 g/l of ammonium perchlorate enters, with a volume of 1000 $m^3$ and containing an activated sludge for purification of urban waste water with denitrifying microorganisms and perchlorate-ion-reducing microorganisms, allows virtually all the nitrite and nitrate ions and more than 80% of the perchlorate ions to be degraded in 36 days.

The process according to the invention consequently makes it possible, by eliminating in general more than 99% of the ammonium ions and more than 80% of the perchlorate ions, to discard the effluent leaving the second reactor into the environment.

If necessary, the effluent leaving the second reactor can be sent to a decanter before it is discarded, in order to avoid any losses of activated sludge.

The example which follows illustrates the invention without, however, limiting it.

EXAMPLE

The installation is composed mainly of two reactors placed in series, each with a working volume of 10 liters, comprising means for stirring and for monitoring the pH and the dissolved molecular oxygen, means for supplying and removing the effluent, as well as means for introducing the additional compounds.

The first reactor is aerobic, open and comprises an air-injection system. The second reactor is a closed, anoxic reactor.

A non-nitrifying activated sludge originating from an urban waste water purification plant functioning at medium-heavy load, with a concentration of materials in suspension (MIS) of 5 mg /l, is introduced into the two reactors. The sludge is acclimatized such that the microorganisms are nitrifying in the first reactor, denitrifying in the second reactor and capable of processing ammonium perchlorate.

An aqueous solution containing 6 g/l of ammonium perchlorate is then introduced continuously into the first aerobic reactor, at a flow rate of 23 ml/h. The following mineral salts were mixed into this solution in the following proportions, expressed in mg of salt per mg of ammoniacal nitrogen: $FeCl_3.6H_2O$: 0.023; $CaCl_2$: 0.058; $KH_2PO_4$: 0.751; $MgSO_4.7H_2O$: 0.401.

The aqueous solution becomes mixed with the activated sludge on stirring. The temperature is maintained at about 25° C. and air is introduced into the mixture such that the concentration of dissolved molecular oxygen is from 4 to 5 mg/l. The concentration of MIS is 100 mg/l and the concentration of volatile materials in suspension (VMS) is about 70 mg/l.

The pH of the mixture is maintained at 7.5 by point additions of a solution containing 30 g/l of sodium hydrogen carbonate, which is also the source of mineral carbon. The $C^1/N^1$ ratio is equal to 1.7.

The liquid effluent leaving the first reactor contains virtually no more ammonium ions and is introduced into the second, anoxic reactor. In this reactor, it is mixed with the activated sludge by stirring, at a temperature of about 25° C. and at a pH of about 8.

The concentration of dissolved molecular oxygen in the mixture is less than 0.2 mg/l. The concentration of MIS is about 30 mg/l and the concentration of VMS is about 20 mg/l. 72 ml of methanol per hour, i.e. a $C_2/N_2$ ratio equal to 1.26, is also simultaneously introduced continuously into this second reactor.

The effluent leaving the second reactor contains only about 5 mg/l of combined nitrogen atoms, i.e. an elimination of 99% of the combined nitrogen present in the aqueous solution introduced into the installation. Its concentration of perchlorate ions is about 1 g/l, i.e. an elimination of 80% relative to the initial concentration. The effluent thus satisfies the set standards for the discarding of waste water.

What is claimed is:

1. Process for the biological purification of a water containing ammonium perchlorate, which comprises treating this water with microorganisms in two successive reactors, wherein:

aqueous ammonium perchlorate solution is placed in contact, in a first, aerobic reactor, with an activated sludge containing nitrifying microorganisms, in the presence of at least one source of mineral carbon and nutritional elements for the metabolism of these microorganisms, and then the liquid effluent leaving the first reactor is placed in contact, in a second, anoxic reactor, with an activated sludge containing denitrifying microorganisms and perchlorate-ion-reducing microorganisms, in the presence of at least one source of organic carbon and nutritional elements for the metabolism of these microorganisms.

2. Process according to claim 1, characterized in that the activated sludge containing the microorganisms originates from the purification of urban waste water.

3. Process according to claim 1, characterized in that, in the first, aerobic reactor, the operation of placing in contact is carried out with a content of molecular oxygen, dissolved in the mixture, of greater than 2 mg/l, with a pH of the mixture maintained between 6 and 9 and at a temperature of between 16° C. and 45° C.

4. Process according to claim 1, characterized in that, in the first, aerobic reactor, the operation of placing in contact is carried out for a period of between 15 and 50 days so as to ensure a rate of nitrification of between 1.5 mg and 2 mg of N—$NH_4^+$/l/h.

5. Process according to claim 1, characterized in that, in the aerobic reactor, the amount of mineral carbon is such that the mass ratio: mineral carbon atoms/nitrogen atoms to be oxidized, is greater than 1.5.

6. Process according to claim 1, characterized in that, in the second, anoxic reactor, the operation of placing in contact is carried out with a content of molecular oxygen, dissolved in the mixture, of less than 0.5 mg/l, at a pH of between 7 and 9 and at a temperature of between 18° C. and 45° C.

7. Process according to claim 1, characterized in that, in the second, anoxic reactor, the operation of placing in contact is carried out for a period of between 15 and 50 days so as to ensure a rate of denitrification of between 1.5 mg and 2 mg of N—NOx/l/h.

8. Process according to claim 1, characterized in that, in the anoxic reactor, the amount of organic carbon is such that the mass ratio: organic carbon atoms/nitrogen atoms to be reduced, is greater than 1.

9. Process according to claim 1, characterized in that the nutritional elements are iron, calcium, potassium, magnesium and phosphate.

10. Process according to claim 1, characterized in that the at least one source of mineral carbon in the aerobic reactor is chosen from the group consisting of sodium hydrogen carbonate and calcium carbonate.

11. Process according to claim 1, characterized in that the at least one source of organic carbon in the anoxic reactor is chosen from the group consisting of methanol, ethanol, propanol, butanol, isopropanol, molasses, glucose and sucrose.

12. Process according to claim 1, characterized in that, in the first, aerobic reactor, the microorganisms belong to the group consisting of Nitrosococcus, Nitrosospira, Nitrosomonas and Nitrobacter.

13. Process according to claim 1, characterized in that, in the second, anoxic reactor, the microorganisms belong to the group consisting of Pseudomonas, Micrococcus, Denitrobacillus, Sirillum and Achroniobacter.

14. Process according to claim 1, characterized in that the ammonium perchlorate concentration in the aqueous solution is less than or equal to 100 g/l.

15. Process according to claim 1, characterized in that the liquid effluent leaving the second reactor is sent to a decanter.

16. Process according to claim 1, characterized in that, in the first, aerobic reactor, the operation of placing in contact is carried out in the presence of at least one compound that neutralizes $H^+$ ions, chosen from the group consisting of sodium hydrogen carbonate, calcium carbonate and magnesium hydroxide.

* * * * *